Figure 1:
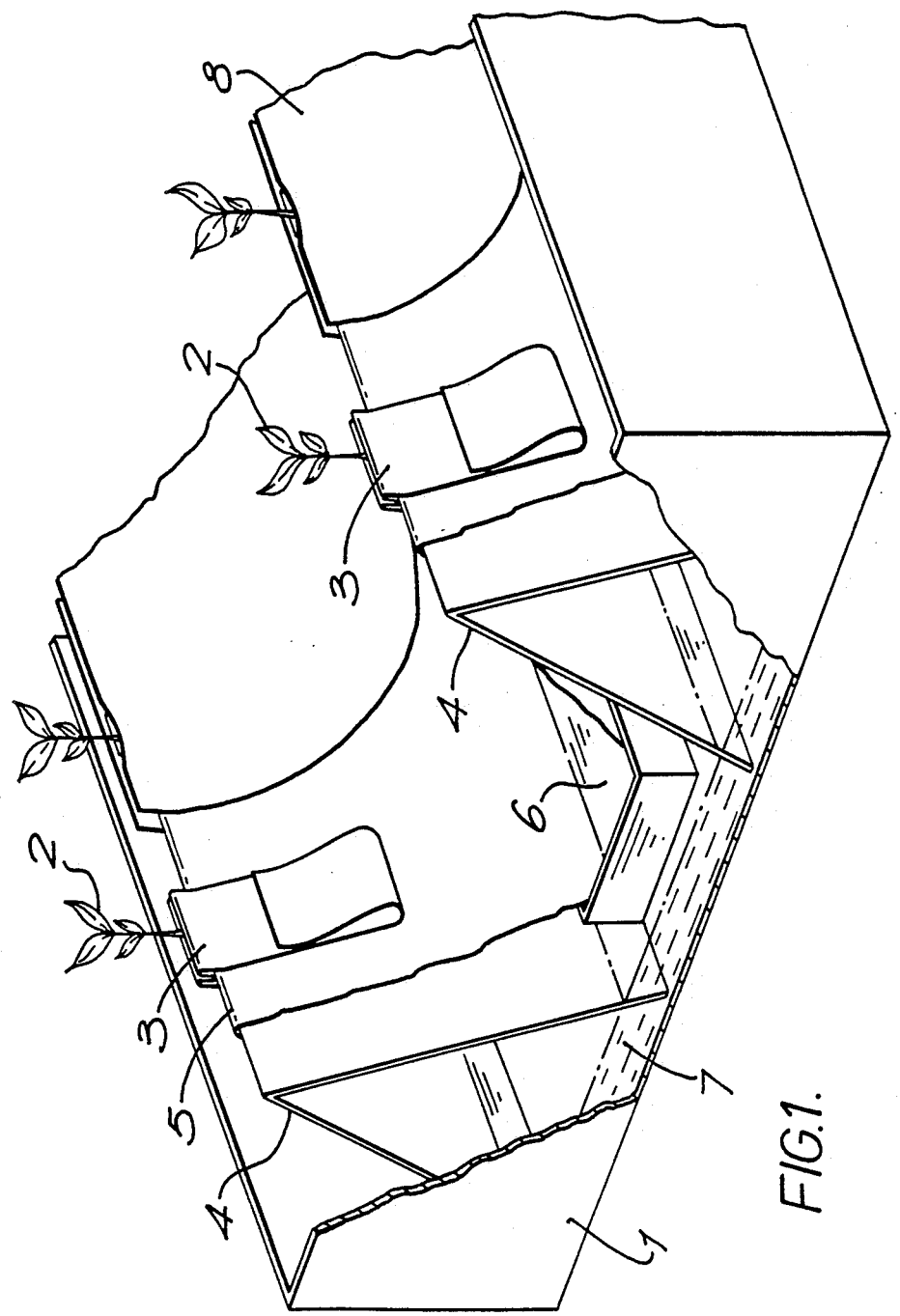

United States Patent [19]
Edwards

[11] Patent Number: 4,953,322
[45] Date of Patent: Sep. 4, 1990

[54] METHOD AND APPARATUS FOR HYDROPONIC CULTIVATION

[76] Inventor: Cyril K. Edwards, 6 Stoughton Close, Oadby, Leicestershire, England

[21] Appl. No.: 319,860

[22] Filed: Mar. 6, 1989

Related U.S. Application Data

[63] Continuation of Ser. No. 7,997, Jan. 29, 1987, abandoned.

[30] Foreign Application Priority Data

Feb. 4, 1986 [GB] United Kingdom ............... 8602641

[51] Int. Cl.$^5$ .............................................. A01G 31/02
[52] U.S. Cl. ........................................................ 47/64
[58] Field of Search ........................... 47/59, 14, 62–65, 47/80, 81

[56] References Cited

U.S. PATENT DOCUMENTS

| | | | |
|---|---|---|---|
| 2,026,322 | 12/1935 | Raines | 47/14 |
| 3,608,238 | 9/1971 | Reuter | 47/64 |
| 4,118,891 | 10/1978 | Kehl et al. | 47/62 |
| 4,149,970 | 4/1979 | Atkins et al. | 47/62 |
| 4,178,716 | 12/1979 | Harper et al. | 47/62 |
| 4,222,199 | 9/1980 | Kehl | 47/59 |
| 4,245,434 | 1/1981 | Green | 47/62 |
| 4,299,056 | 11/1981 | Towning | 47/81 |
| 4,531,324 | 7/1985 | Yang et al. | 47/59 |

FOREIGN PATENT DOCUMENTS

| | | | |
|---|---|---|---|
| 2748010 | 4/1978 | Fed. Rep. of Germany | 47/59 |
| 1582843 | 1/1981 | United Kingdom . | |
| 2050788 | 1/1981 | United Kingdom | 47/62 |
| 2113518 | 1/1983 | United Kingdom . | |
| 8504494 | 1/1983 | United Kingdom . | |
| 2130465 | 6/1984 | United Kingdom | 47/62 |

OTHER PUBLICATIONS

Cooper, *The ABC of NFT*, Root Exudation and Nitrogen Fixation, pp. 111–113 Grower Books, 49 Doughty Street, London, 1979.

Primary Examiner—Danton D. DeMille
Attorney, Agent, or Firm—Bacon & Thomas

[57] ABSTRACT

A method of growing a plant hydroponically wherein nutrient solution is drawn by surface tension from a nutrient supply and conveyed to the root system of said plant by a layer of hydrophilic material, said nutrient solution passing at least intermittently in one direction across said root system thereby removing exudates from said root system to a collecting area while supplying said plant's requirements for nutrients and water.

20 Claims, 2 Drawing Sheets

METHOD AND APPARATUS FOR HYDROPONIC CULTIVATION

This application is a continuation of application Ser. No. 007,997 filed Jan. 29, 1987 now abandoned.

This invention relates to an improved method and apparatus for growing plants hydroponically. More particularly it provides a means for overcoming the adverse effects of root exudates during hydroponic cultivation.

One of the major problems of all hydroponic systems is that of preventing root exudates from polluting the nutrient solution supplied to the roots. Any build-up of waste products of metabolism in the nutrient solution immediately around the root system progressively inhibits the uptake of fresh nutrient salts, gases and water, and causes the concentration of waste products within the root tissue to rise to levels which inhibit metabolic activity.

In static nutrient solutions this problem is extremely acute. The dispersal of the waste products of metabolism from the area immediately around the roots and the provision of fresh nutrients and dissolved oxygen to the roots are limited to that which can be achieved by natural diffusion. The rates of movement achievable by diffusion in a static solution are normally inadequate to sustain healthy growth in plants except where the natural rate of metabolism is low, such as in seedlings or slow growing plants such as ornamentals. In all other cases healthy growth can be sustained in static solutions for only a limited period which is far too short to bring most plants to fruition.

We have now found in accordance with one aspect of our invention, that this problem can be mitigated or overcome by a method of growing a plant hydroponically wherein nutrient solution is drawn by surface tension from a nutrient supply and conveyed to the root system of said plant by a layer of hydrophilic material, said nutrient solution passing at least intermittently in one direction across said root system thereby removing exudates from said root system to a collecting area while supplying said plant's requirements for nutrients and water.

Another aspect of our invention provides apparatus for cultivating a plant hydroponically comprising a supply of nutrient solution, a collecting means for conveyed nutrient solution, and a layer of hydrophilic material extending from said supply to said collecting means, for conveying nutrient solution by capillarity to a plant whose root system is in contact with said hydrophilic material, whereby excess nutrient solution, in passing across said root system, carries root exudates from said root system to said collecting means.

The flow of nutrient solution is induced by capillarity and takes the form of thin films of nutrient solution moving along the surfaces of the interlinked fibres, foamed cells, or the like, of which the hydrophilic layer is composed. To take advantge of this supply of nutrient solution the roots of the plants, which are themselves hydrophilic, develop intimate contact with the thin films and draw nutrients and water from them. In so doing they progressively reduce the thickness of the films, but as long as the amount of nutrient solution flowing is greater than that taken up by the root system, there will be a residual flow through and beyond the roots. I have found that good results can be obtained when the volume of nutrient solution conveyed to the collecting area is from 20 to 70%, preferably from 30 to 50%, of that supplied to said plant.

It has long been realised that thin films of solution carried by surface tension on hydrophilic material provide an efficient means of communicating nutrients to a root system. What we have discovered is that if the hydrophilic material is so disposed that there is a unidirectional net flow of films of solution across the root system, these films, being intimately in contact with the roots, will provide a very efficient means of collecting root exudates and of carrying them from the root systems. We have found that for the films to do this there must be a residual flow beyond the root system and this residual flow must be carried down to a level which is lower than the surface of the nutrient supply so that the films can be turned into free liquid which can then be directed to a collecting means.

It is important to realise that root exudates have a vital role to play in influencing the pattern of development of plants. They contain various growth regulating hormones which are beneficial at optimal concentrations and adversely affect the development of the plant only when they are present at concentrations outside the optimal range.

Our discovery provides an elegant way of allowing a plant to select the desired hormonal balance. It gives the root system complete freedom to develop where it wants within a range of environments. The hydrophilic layer immediately above the nutrient supply is saturated with fresh nutrient solution and as the solution passes through the root system the nutrient concentration progressively declines and the exudate concentration increases. What we have found is that these variations in the flow pattern through the hydrophilic layer can be maintained constant spatially, and hence can provide a stable environment for root development.

One important advantage of the system is that it greatly reduces the requirement for acid. In commercial growing, regular additions of acid (usually nitric or phosphoric) are required partly to correct the pH of the incoming water but mainly to counteract the effect of alkaline exudates. By segregating the exudates we can substantially reduce the acid required to maintain the solution at the desired pH level.

Whilst one of the main attractions of the sytem is that it enables the plants to maintain vigorous growth over extended periods even in unpowered systems having a static supply of nutrient solution, it has an added advantage in that it permits mixed cropping. The exudates from one crop, for instance French beans, can be very damaging to another crop, for instance melons, and so they cannot be grown successfully in the same solution. What we are finding with the new system is that there is little longitudinal spread of exudates—the main flow being over the ridge towards the collecting area—and so different crops can happily be grown together provided that the excess nutrient solution conveyed to the collecting area is discarded.

Another advantage of the system is the ability to utilise partly saline (brackish) water for making up the nutrient solution. In known hydroponic systems, any salinity in the make-up water becomes progressively concentrated as the nutrient solution is recirculated, thus imposing a requirement to use water of high quality, which is virtually unobtainable in many regions of the world. In the method of our invention, the unwanted saline components can be continually passed to waste without causing an excessive osmotic load on the plants.

The system also lends itself readily to hypertonic feeding, as defined in our British Patent Appliction No. 8504494. Hypertonic feeding is a means of enhancing nutrient uptake by plants by exposing their root systems for short periods to relatively concentrated nutrient solution. With the present invention this can be achieved by intermittently draining the normal nutrient solution and introducing into the nutrient supply a measured amount of more highly concentrated nutrient solution. When this comes into contact with the layer of hydrophilic material it is lifted by surface tension and carried across the root system as a discrete band of higher concentration nutrient solution. The individual roots are exposed to the higher concentration solution for the period during which the band is passing by them, and this period of exposure can readily be controlled by regulating the band width.

Instead of merely altering the concentration of the nutrient solution, one may alter its composition. For instance, one may intermittently supply a desired nutrient or combination of nutrients which is chemically or physiologically incompatible with the normal nutrient solution; a band of said desired nutrient can be made to pass through said hydrophilic sheet material essentially without mixing with the normal nutrient solution. As an example, one may periodically supply a solution of a calcium salt, which would ordinarily precipitate as calcium phosphate in the presence of the normal nutrient solution. Or trace elements may be periodically supplied from a solution low in nitrogen, thus obviating the inhibition of trace element uptake by a high nitrogen root input.

Numerous types of apparatus can be devised to fulfil the principles of our invention. It is convenient for the nutrient solution to be supplied from a gully to which said solution is admitted or through which it is recirculated. The collecting means may comprise a further gully.

In one preferred embodiment of our invention, plants are supported on two parallel ridges which form the side walls of a central gully which contains a supply of nutrient solution. The ridges are clothed with layers of hydrophilic material which communicate the nutrient solution from the central gully to the root systems of the plants and down the outer wall of the ridges to collecting channels. The nutrient solution contained by the gully can be either static or recirculatory. The rate at which nutrient solution flows across the hydrophilic sheet can be varied by controlling the level of the solution in the collecting channel relative to the level of the nutrient supply. If the two solutions are maintained at the same level there will be no net flow and the plant will feed from both channels, but as the solution in the collecting channel is lowered relative to the nutrient supply the flow across the sheet towards the collecting channel will increase. Usually it is advantageous to discard the nutrient solution conveyed to the collecting means, but we have found, surprisingly, that good results are often obtained by feeding this solution to the plant and only purging solution from the collecting means to waste periodically at relatively long intervals.

The level of the solution in the collecting means can conveniently be controlled by providing this in the form of a vessel floating in the supply of nutrient solution. By adjusting the draught of the vessel one may make sensitive alteration to the flow rate of the nutrient solution. Moreover the system automatically compensates for differences in the level of the fresh nutrient supply.

In another preferred embodiment of our invention plants are supported on a gully of the general type described in our GB-A-2,113,518. In such apparatus, the gully comprises a plurality, generally two, separate channels and the plants are supported on a wall or ridge dividing said channels. This enables the root system of the plant to develop in the form of two or more separate portions, one in each channel, and enables the portions to be supplied repetitively and unequally with nutrients, whereby the pattern of cell differentiation in the vascular tissues connecting the said portions to the upper plant is modified by the formation of an increased number of cross-linkages within and between the tissues. The advantages of growing a plant in this way are fully explained in our aforesaid Specification. For use in our invention, the ridge is divided at its apex to accommodate a layer of hydrophilic material extending from each of said supply channels to the apex of said ridge and passing down between the walls of the ridge into a central collecting channel.

This construction has the major advantage that the flow of nutrients across the root system is always from the root tip to the mature root. Thus the root tip is provided with a fresh nutrient supply, while the root exudates build up progressively in the nutrient solution as it flows towards the mature root. We have found that the mature root can tolerate a higher concentration of root exudates, while the root tip is not very tolerant of exudates from the mature root. By providing fresh nutrient solution to the root tip we mimic natural conditions wherein the root tip grows into fresh soil while the mature root inhabits a region polluted by its own exudates.

The above advantages applies whether or not the nutrients are cycled unequally to the two root portions fed from the two supply channels.

The plants are conveniently supported on a dividing wall or ridge in propagation pockets, each comprising a pocket of hydrophilic absorbent sheet material, said pocket being open at its upper end and having two or more dependent portions of said material for conveying nutrient solutions to a plant, e.g. a seed or other plant reproductive material, located in said pocket. Such propagation pockets are more fully described in our GB-A-2,164,536.

Two embodiments of our invention will now be described by way of example with reference to the accompanying drawings wherein:

FIG. 1. is a perspective view partially cut away of a first embodiment wherein plants are supported on two parallel ridges which rest within a nutrient supply vessel.

Figure 2:
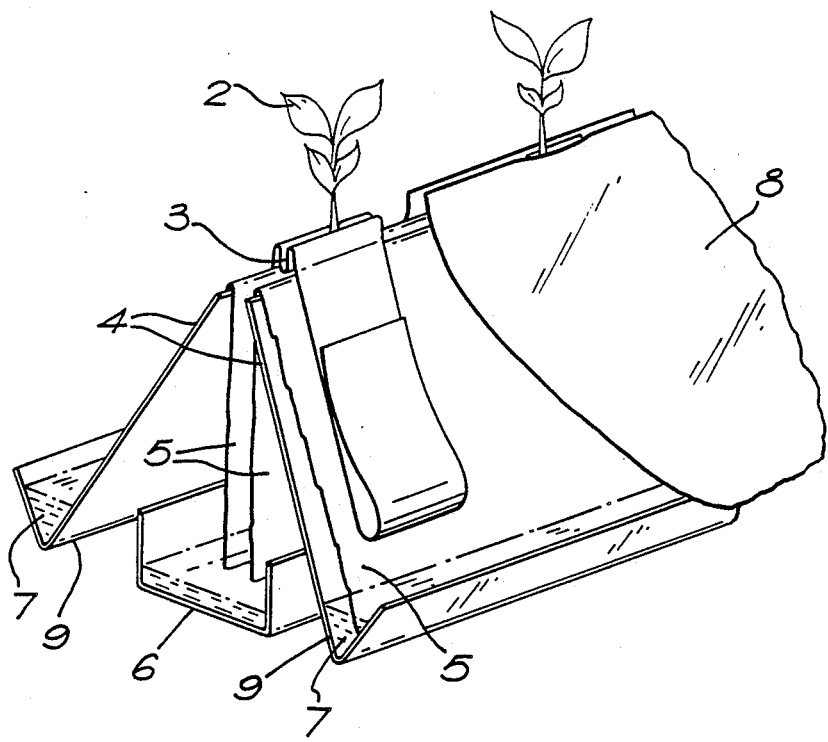

FIG. 2. is a similar view of a second embodiment in which plants are supported on a central ridge located between two gullies which contain supplies of nutrient solution.

Referring to FIG. 1, rows of plants 2 are grown in propagation pockets 3 supported on ridges 4 which rest inside nutrient supply vessel 1. Each of the ridges is clothed with sheets of hydrophilic material 5 which extend over the outer wall of the ridge, down the inner wall to an exudate collecting vessel 6 which floats in nutrient solution 7 contained within nutrient supply vessel 1. The draught of the exudate collecting vessel is so arranged that the hydrophilic material entering it is held at the level which gives the desired flow rate. The nutrient solution may be either static or recirculating and this solution is lifted by the hydrophilic material over the ridges, through the roots of the plants, to the exudate collecting vessel. To prevent the growth of algae the nutrient supply vessel is covered with an opaque flexible plastics sheet 8.

In operation, the depth of the nutrient solution is regulated to provide a flow of nutrient solution over the ridges adequate to meet the needs of the plants and to carry root exudates from the roots to the collecting channel 6 from which it may either be discarded or permitted to return to the plant via the hydrophilic material.

Referring now to FIG. 2, rows of plants 2 are grown in propagation pockets 3 supported on a divided ridge 4 which lies between two gullies 9. The ridge is clothed with sheets of hydrophilic material 5 which extend on each side from the gully 9 over the outer wall of the ridge, through the roots of the plants, and down through the divide to a collecting channel 6. Each of the gullies contains a supply of nutrient solution 7 which may be either static or recirculating, and this solution is lifted by the hydrophilic material over the outer walls of the ridges, through the roots of the plants, to the central collecting channel. To prevent the growth of algae the ridge and the gullies are covered with an opaque flexible plastics sheet 8.

I claim:

1. A method of growing a plant hydroponically which comprises applying a nutrient solution to the root of said plant and removing exudates which are carried from said root by a sheet of hydrophilic material, which is so disposed that it carries said nutrient solution by capillarity from a source thereof upward past said root situated above said source to a collecting area situated below the level of said source, and wherein said nutrient solution in the hydrophilic material, flows by capillarity in an upward direction against gravity extending from the root tip to the mature root of said plant and carries said exudates in the same direction.

2. The method of claim 1 wherein the normal nutrient solution is intermittently drained and a measured amount of more highly concentrated nutrient solution is introduced into the nutrient supply.

3. The method of claim 1 wherein said nutrient solution passes only once across said root system and wherein the solution in said collecting area is discarded.

4. The method of claim 1 wherein the nutrient solution conveyed to said collecting area is subsequently fed to said plant.

5. The method of claim 1 wherein said plant is supported in a pocket of hydrophilic material, said pocket being open at its upper end and having at least two dependent portions for conveying nutrient solution to a plant located in said pocket.

6. The method of claim 1 wherein said supply of nutrient solution is static.

7. The method of claim 6 wherein the plants maintain vigorous growth over extended periods of time.

8. The method of claim 1 wherein the volume of nutrient solution conveyed to the collecting area is from 20 to 70% of that supplied to said plant.

9. The method of claim 1 wherein the volume of nutrient solution conveyed to the collecting area is from 30 to 50% of that supplied to said plant.

10. The method of claim 1 wherein the plants are mixed crops.

11. The method of claim 10 wherein the mixed crops are French beans and melons.

12. The method of claim 1 wherein the nutrient solution is made up with partly saline water.

13. The method of claim 1, wherein sufficient root exudates are removed to prevent inhibition of metabolic activity.

14. The method of claim 1, wherein variations in the flow pattern of the nutrient solution through the hydrophilic layer is maintained constant spatially to provide a stable environment for root development.

15. The method of claim 14, wherein said supply of nutrient solution is static.

16. An apparatus for cultivating a plant hydroponically comprising a source of nutrient solution, a collecting means for conveyed nutrient solution said collecting means situated below the level of said source, and a layer of hydrophilic material extending from said source to said collecting means said hydrophilic material having a portion supporting a plant above said source for conveying nutrient solution upward against gravity by capillarity to a plant whose root system is in contact with said hydrophilic material, whereby excess nutrient solution, in passing across said root system, flows in a direction extending from the root tip to the mature root of said plant and carries root exudates from said root system to said collecting means.

17. The apparatus of claim 16 wherein the source of nutrient solution comprises two supply channels, a ridge is formed between the two supply channels, the apex of said ridge being divided to accommodate a layer of hydrophilic material extending from each of said supply channels to the apex of said ridge and downwardly into collecting means which is a centrally located collecting channel.

18. The apparatus of claim 17 wherein a plant is supported on said ridge in a pocket of hydrophilic sheet material, said pocket being open at its upper end and having at least two dependent portions for conveying nutrient solution to a plant located in said pocket.

19. The apparatus of claim 17 wherein said supply of nutrient solution is static.

20. An apparatus for cultivating a plant hydroponically, wherein the source of nutrient solution comprises two supply channels, a ridge is formed between the two supply channels, the apex of said ridge being divided to accommodate a layer of hydrophilic material extending from each of said supply channels to the apex of said ridge and downwardly into a central collecting channel, and wherein a plant is supported on said ridge in a pocket of hydrophilic sheet material, said pocket being open at its upper end and having at least two dependent portions for conveying nutrient solution to said plant in said pocket.

* * * * *